(12) United States Patent
Klein et al.

(10) Patent No.: US 7,267,348 B1
(45) Date of Patent: Sep. 11, 2007

(54) VEHICULAR SUSPENSION SYSTEMS

(75) Inventors: Jason M. Klein, Springfield, MO (US); Emmitt A. Scammahorn, Billings, MO (US); Kevin C. Schlack, Battlefield, MO (US)

(73) Assignee: Cush Corporation

( * ) Notice: Subject to any disclaimer, the term of this patent is extended or adjusted under 35 U.S.C. 154(b) by 354 days.

(21) Appl. No.: 10/800,536

(22) Filed: Mar. 15, 2004

Related U.S. Application Data (60) Provisional application No. 60/454,858, filed on Mar. 14, 2003.

(51) Int. Cl.
*B60G 1/00* (2006.01)

(52) U.S. Cl. .......................... 280/124.128; 280/124.1; 280/124.116; 29/897.2

(58) Field of Classification Search .................. 267/52; 248/200; 280/124.1, 124.128, 124.157, 124.116; 29/897.2
See application file for complete search history.

(56) References Cited

U.S. PATENT DOCUMENTS

| | | | | |
|---|---|---|---|---|
| 3,386,724 A * | 6/1968 | Chieger et al. ................ 267/52 |
| 3,510,149 A | 5/1970 | Raidel |
| 3,707,298 A * | 12/1972 | Henry et al. .......... 280/124.116 |
| 3,771,812 A | 11/1973 | Pierce et al. ............. 280/124 F |
| 3,861,708 A | 1/1975 | Fier ......................... 280/124 F |
| 3,902,734 A | 9/1975 | Fier ......................... 280/106 R |
| 3,904,220 A | 9/1975 | Fier ......................... 280/124 F |
| 4,375,896 A * | 3/1983 | Barnes .................... 280/124.1 |
| 4,693,486 A * | 9/1987 | Pierce et al. ................. 280/80.1 |
| 4,792,148 A | 12/1988 | Hintz ......................... 280/81 A |
| 4,881,747 A | 11/1989 | Raidel ........................ 280/81.6 |
| 5,015,004 A | 5/1991 | Mitchell ..................... 280/81.6 |
| 5,018,756 A | 5/1991 | Mitchell ..................... 280/81.6 |
| 5,058,916 A | 10/1991 | Hicks .......................... 280/704 |
| 5,112,078 A * | 5/1992 | Galazin et al. ........ 280/124.116 |
| 5,366,237 A * | 11/1994 | Dilling et al. ......... 280/124.116 |
| 5,375,871 A * | 12/1994 | Mitchell et al. ....... 280/124.116 |
| 5,403,031 A | 4/1995 | Gottschalk et al. .......... 280/704 |
| 5,476,251 A * | 12/1995 | Moses et al. .................. 267/52 |
| 5,921,570 A * | 7/1999 | Lie ....................... 280/124.175 |
| 6,843,490 B2 * | 1/2005 | Raidel et al. .......... 280/124.116 |
| 2001/0020775 A1 * | 9/2001 | Pierce et al. ........... 280/124.128 |
| 2004/0021288 A1 | 2/2004 | Raidel, II et al. |

OTHER PUBLICATIONS

Product Brochure for INTRAAX® Suspension Systems of The Boler Company (6 sheets) (Copyright 2002).

(Continued)

*Primary Examiner*—Ruth Ilan
(74) *Attorney, Agent, or Firm*—Jonathan A. Bay (57) ABSTRACT

A vehicular suspension system has a hanger to attach beneath a vehicle, a rocker pivoted at a first end to the hanger and attached proximate a second end to an axle, a shock absorber extending between the hanger and an intermediate position on the rocker, as well as likely a spring on the rocker's second end to push up against the overhead vehicle. The suspension system incorporates an axle saddle configured for more strongly welding to the axle, as well as a composite construction for the rocker to make a tube and thereby achieve a more strongly welded connection to the axle saddle. The suspension system further incorporates a rocker-to-hanger rocking axis alignment subsystem as well as a shock-absorber protection subsystem.

8 Claims, 7 Drawing Sheets

OTHER PUBLICATIONS

Product Brochure for RIDESTAR™ Suspension Systems of Meritor Heavy Vehicl Systems. LLC. Troy. Michigan (4 sheets) (Copyright 2001).

Product Brochure for 20AR and 22AR Suspension Systems of Reyco Granning Suspensions. Springfield. Missouri (4 sheets) (dated Feb. 2002).

Product Brochure for ADVANTAGE™ Suspension Systems of Dana Corporation. Kalamazoo. Michigan (4 sheets) (Copyright 2002).

Procut Brochure for MONOPIVOT 240 Series Suspension Systems of Ridewell Corp.. Springfield. Missouri (4 sheets) (undated).

* cited by examiner

VEHICULAR SUSPENSION SYSTEMS

CROSS REFERENCE TO PROVISIONAL APPLICATION(S)

This application claims the benefit of U.S. Provisional Application No. 60/454,858, filed Mar. 14, 2003, which provisional application is incorporated herein in full by this reference.

BACKGROUND AND SUMMARY OF THE INVENTION

The invention relates vehicular suspension systems and, more particularly, to those employing longitudinally trailing rocker or control beams. An example typical use environment includes without limitation heavy-duty, over-the-road trailers having tandem dual, triple, or quadruple and so on axles rated at a unit axle capacity of 25,000 pounds (~10,000 kilos) each.

It is an object of the invention to provide an axle saddle design that provides an enhanced, stronger welded connection to the wheel axle.

It is an alternate object of the invention to provide a design for the trailing rocker- or control-beams so that they also provide an enhanced, stronger welded connection to the axle saddle.

It is another object of the invention to provide a rebound limiter subsystem which protects a shock absorber for said vehicular suspension system from potentially damaging instances of over-extension all at the same time as being completely contained within the vehicular suspension system itself, without requiring connection or coupling to extraneous parts such as either the vehicle frame, which forms no part of the invention, or the axle-and-wheel package, which likewise forms no part of the invention.

It is an additional object of the invention to provide the trailing rocker- or control-beam with an alignment subsystem in order to afford installers and/or end users the opportunity to adjust the alignment of the trailing rocker- or control-beam's rocking axis relative the vehicle.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
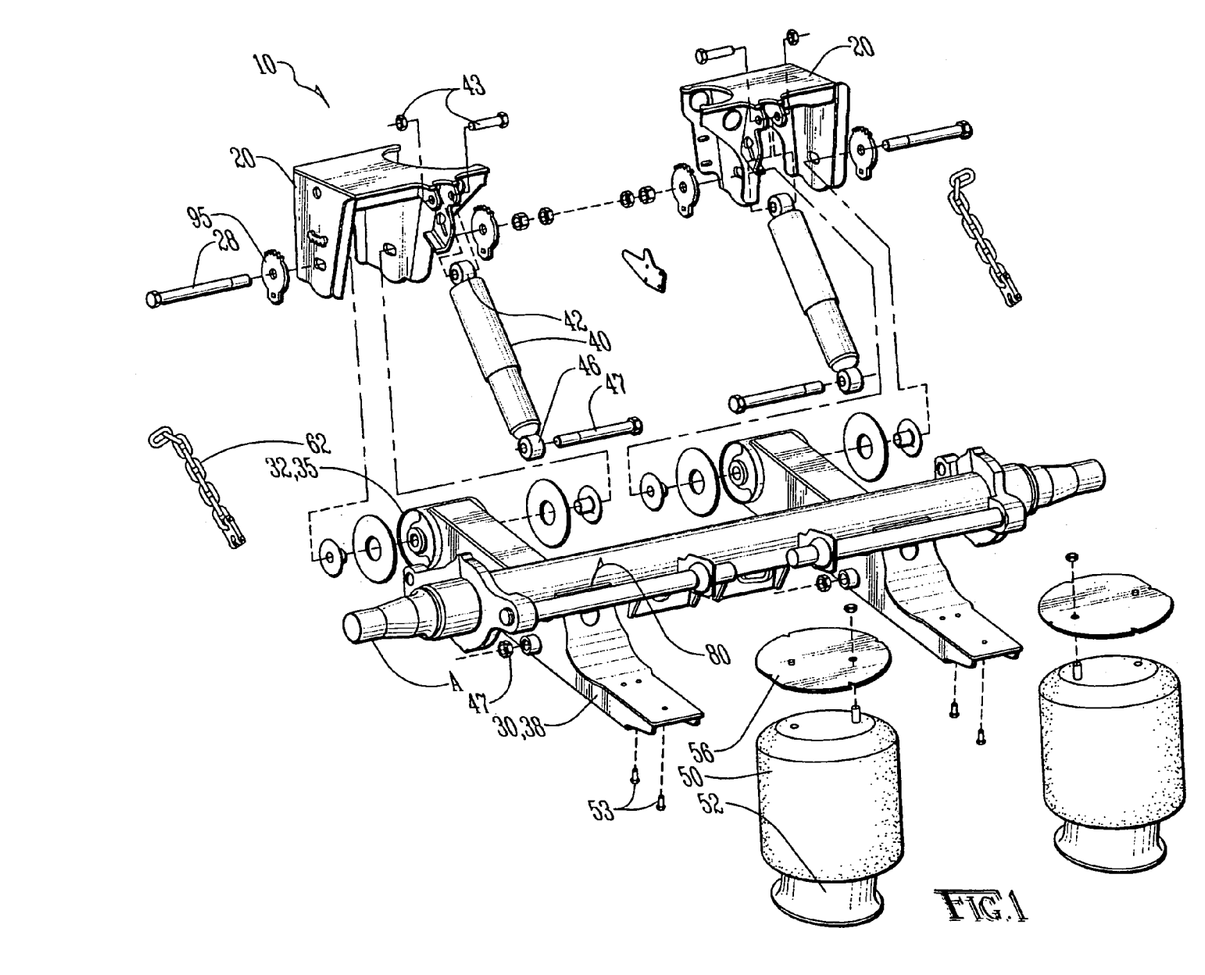
FIG. 1 is an exploded perspective view of vehicular suspension system in accordance with the invention which, in this particular instance, is an example of what is more particularly characterized as having each rocker- or control-beam's leading, pivoted end configured as a transverse bushing sleeve (and bushing therefor) for pivotally pinning between a pair of spaced flanges of a corresponding rocker hanger, and wherein the rocker-or control-beam's trailing portions are characterized as "underslung," that is, relative the connection to the wheel axle.

FIG. 1 shows a first embodiment of a vehicular suspension system 10 in accordance with the invention. This suspension system 10 comprises a pair of frame hangers 20 for securing to the underside of the vehicle's frame (vehicle and/or frame therefor are not shown). Each hanger 20 carries a longitudinally trailing rocker- or control-beam 30. This embodiment is characterized in part as having each rocker- or control-beam 30's leading, pivoted end 32 configured as a transverse bushing sleeve 35, as for receiving a bushing 18 therein. The hanger 20 has a pair of spaced depending flanges 22 with pin holes or slots 24 for accepting a pivot pin 28 that pivotally pins the rocker- or control-beam 30 to the hanger 20, such that the pin 28's axis defines the rocking axis for the beams 30. This embodiment is characterized in other part as having the rocker- or control-beam 30's trailing portions 38 designed as "underslung" as, that is, relative to being connected to the wheel axle A from below (in contrast to above).

Other aspects of the suspension system include a pair of shock absorbers 40, one for each hanger-and-beam combination. Each shock absorber 40 has an upper end 42 pinned to the respective hanger 20 by fasteners 43 and lower ends 46 pinned to the corresponding rocker- or control-beam 30 by fasteners 47 at a position spaced away from the rocking axis (eg., pivot pin 28's central axis) as shown. Also, there are a pair of air springs 50, one for each beam 30, that have lower ends 52 fastened to the beam tails 38 by fasteners 53 and upper ends 56 fastened to the underside of the vehicle frame (vehicle and/or frame therefor are not shown).

Other aspects of the invention include a beam-to-hanger rocking axis alignment or adjustment subsystem 90 for each hanger and as will be more particularly described below in connection with FIG. 7. Also, there are various other inventive aspects involved with the beam-to-axle connection as will be will be more particularly described below in connection with FIGS. 3 through 6. Additionally, there is an inventive rebound limiter subsystem 60 for each beam-and-hanger combination as more particularly described next in connection with FIGS. 2a through 2c.

Figure 2A:
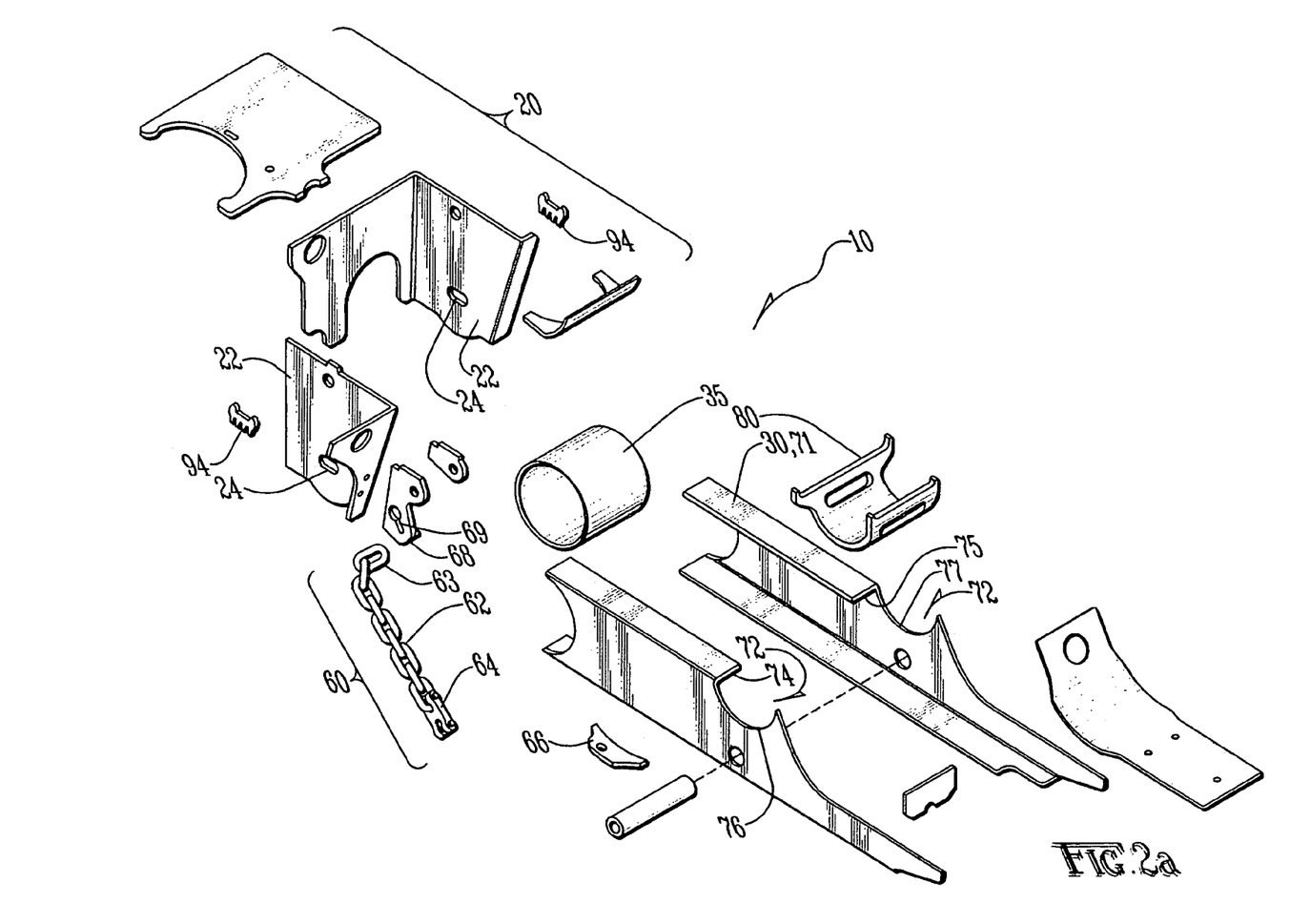
FIG. 2a is an enlarged exploded perspective view of the right half of FIG. 1, with various elements further exploded or fragmented and various other elements removed from the view for convenience in order to better show aspects related to one embodiment of a rebound limiter subsystem in accordance with the invention.
Figures 2B, 2C:
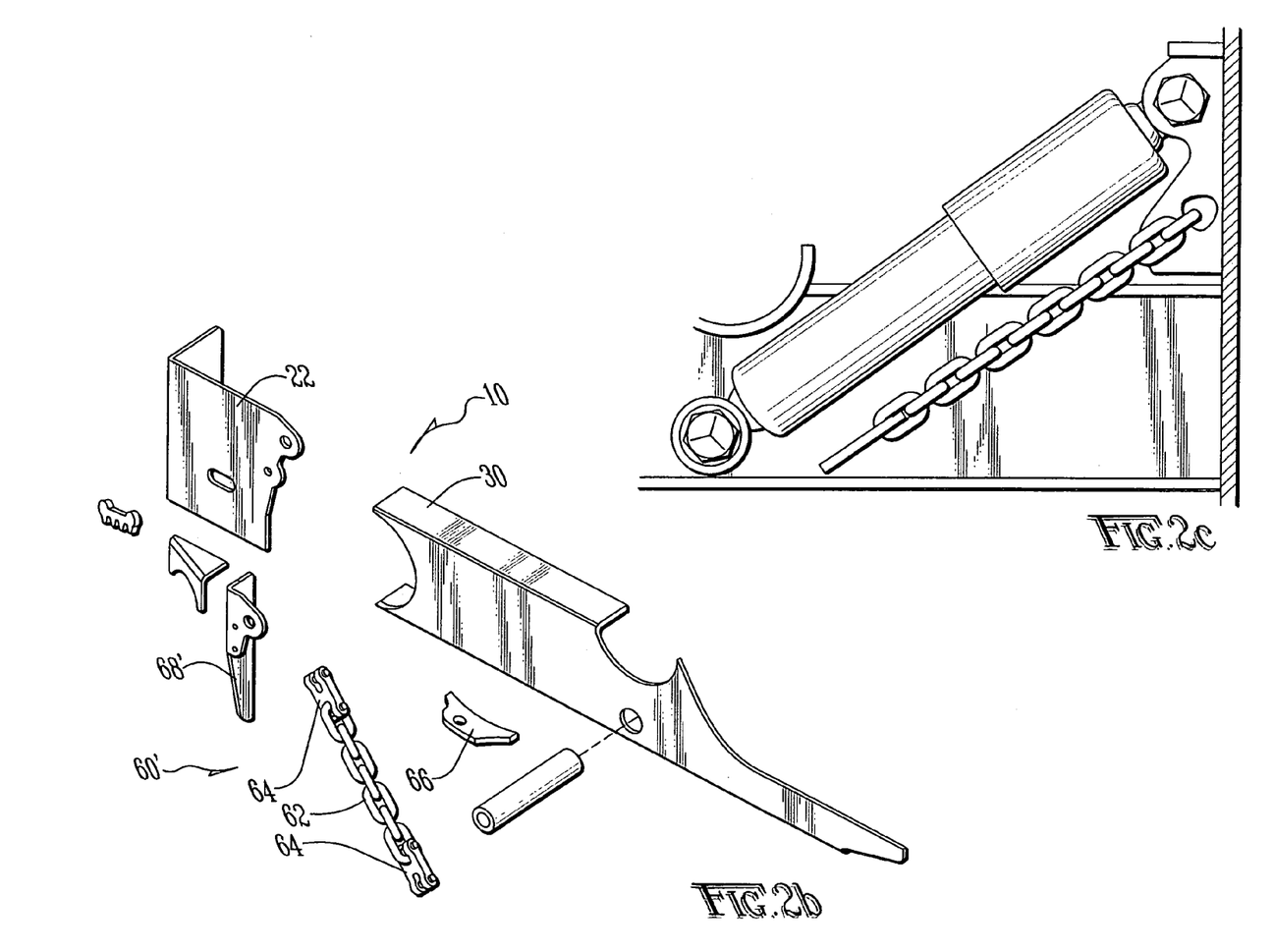
FIG. 2b is an exploded perspective view comparable to FIG. 2a except showing an alternate embodiment of a rebound limiter sub-system in accordance with the invention and also except that various elements from FIG. 2a are removed from this view for convenience sake.
FIG. 2c is side elevational perspective view fairly comparable to FIG. 2b except showing the elements of FIG. 2c assembled and not exploded, and including illustration of a representative shock absorber.

Starting first in FIG. 2c, it shows that one aspect of the rebound limiter subsystem 60 involves protecting the corresponding shock absorber against potentially damaging instances of over-extension. In use, if the vehicle is traveling over rough road and the wheels bounce, the lower limit of the wheel's bounce will be jerked to a stop by the tightening chain (eg., indicated as reference numeral 62 in FIG. 2a or 2b). That way, the shock absorber won't be overextended, which can damage/destroy it.

To turn back to FIGS. 2a and 2b, these views show another aspect of the rebound limiter subsystem 60. And that is, namely, that all its operative components are wholly incorporated or integrated within the suspension system 10. That way, the rebound limiter subsystem 60 is pre-packaged within the overall vehicular suspension system 10. Accordingly, installers installing the vehicular suspension system 10 in accordance with the invention are served by its convenient "plug-and-play," ready-to-go completeness once the hangers 20 and air-spring tops 56 are fastened. In other words, there is no necessity for an installer to make another attachment to the vehicle and/or its frame (vehicle and/or frame therefor are not shown) for the sake of the rebound limiter subsystem 60. The chain 62's length and its terminal connections 66 and 68 are "factory" set, so to speak.

This is all achieved as shown by FIG. 2a with a chain 62 extending between opposite tag ends. The lower tag end has a clevis 64 attached to it. The upper tag end has the end link 63 turned crosswise in the immediately preceding link and welded fixed in the condition as shown. The beam 30 has an inboard lateral wall on which is formed (eg., welded thereto) a tab portion 66, which has a hole through it for the clevis 64 to couple to. The inboard flange of the hanger 20 comparably has a tab portion 68 formed on it (eg., welded thereto). The tab portion 68 on the hanger has a T-shaped slot 69 formed in it for affording quick-connect and -disconnect of the chain 62's crosswise end link 63. The length of the chain 62 and the placement of the respective tab portions 68 and 66 on the hanger and beam 20 and 30 respectively are chosen for safely protecting given shock absorbers from potentially damaging over-extension wear and tear.

FIG. 2b is fairly comparable to FIG. 2a except showing an alternate embodiment of a rebound limiter subsystem $60^1$, wherein the chain is provided with devises 64 at both ends. The hanger 20's tab portion $68^1$ is modified to substitute a simple round hole for the T-shaped slot. This FIG. 2b version of the rebound limiter subsystem $60^1$ in accordance with the invention provides more secure connection of the chain 62 to its anchorage at both ends. However, it also sacrifices the convenient quick-connect/-disconnect aspect of the FIG. 2a version.

The rebound limiter aside, FIG. 2a shows other aspects of the vehicular suspension system 10. Namely, that the beam 30 is a composite of two channels 70 and 71 faced edge-to-edge, and ultimately welded together to form a rectangular or square tube. The advantage of this construction is that the beams 30 preferably slightly thin out along their extension. Accordingly, the beams 30 are ever so slightly tapered. It is not known if solid-piece tapered tubing is available in the measures and materials required for practicing the invention. Therefore, it is one solution to fabricate such tapered tubing to meet the measures and materials required by doing so with a composite construction as shown, involving butt-welding two channel pieces as shown.

With that in mind, further aspects of the invention relate to an inventive axle saddle 80 as indicated by reference numeral in FIG. 2a, or more particularly in concern of its design advantages for connecting to an axle (not shown in FIG. 2a). In addition, still further aspects of the invention relate to the overall execution of the beam-to-saddle connection.

Figure 3:
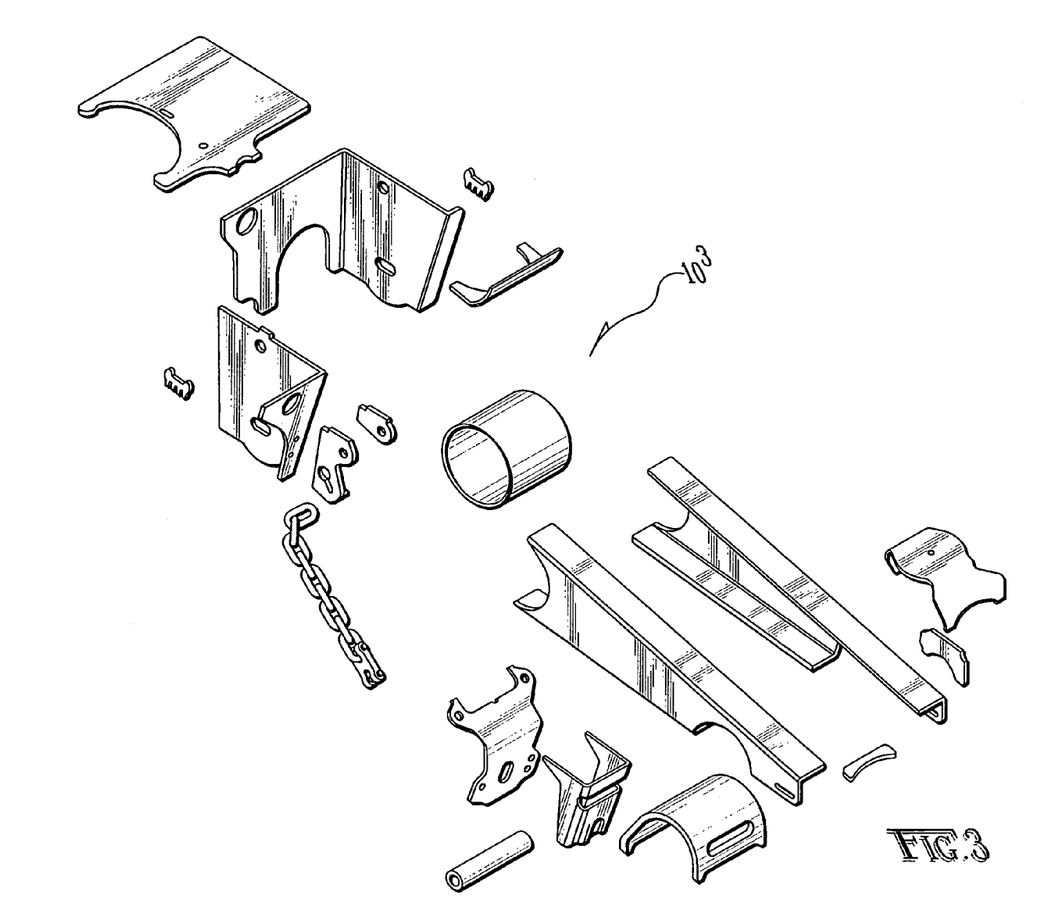
FIG. 3 is an exploded perspective view comparable to FIG. 2a, except showing an alternative embodiment of a vehicular suspension system in accordance with the invention, wherein in contrast to FIGS. 1 and 2a which show underslung rocker- or control-beam(s), this view shows an overslung configuration for such rocker- or control-beam(s)
Figure 4:
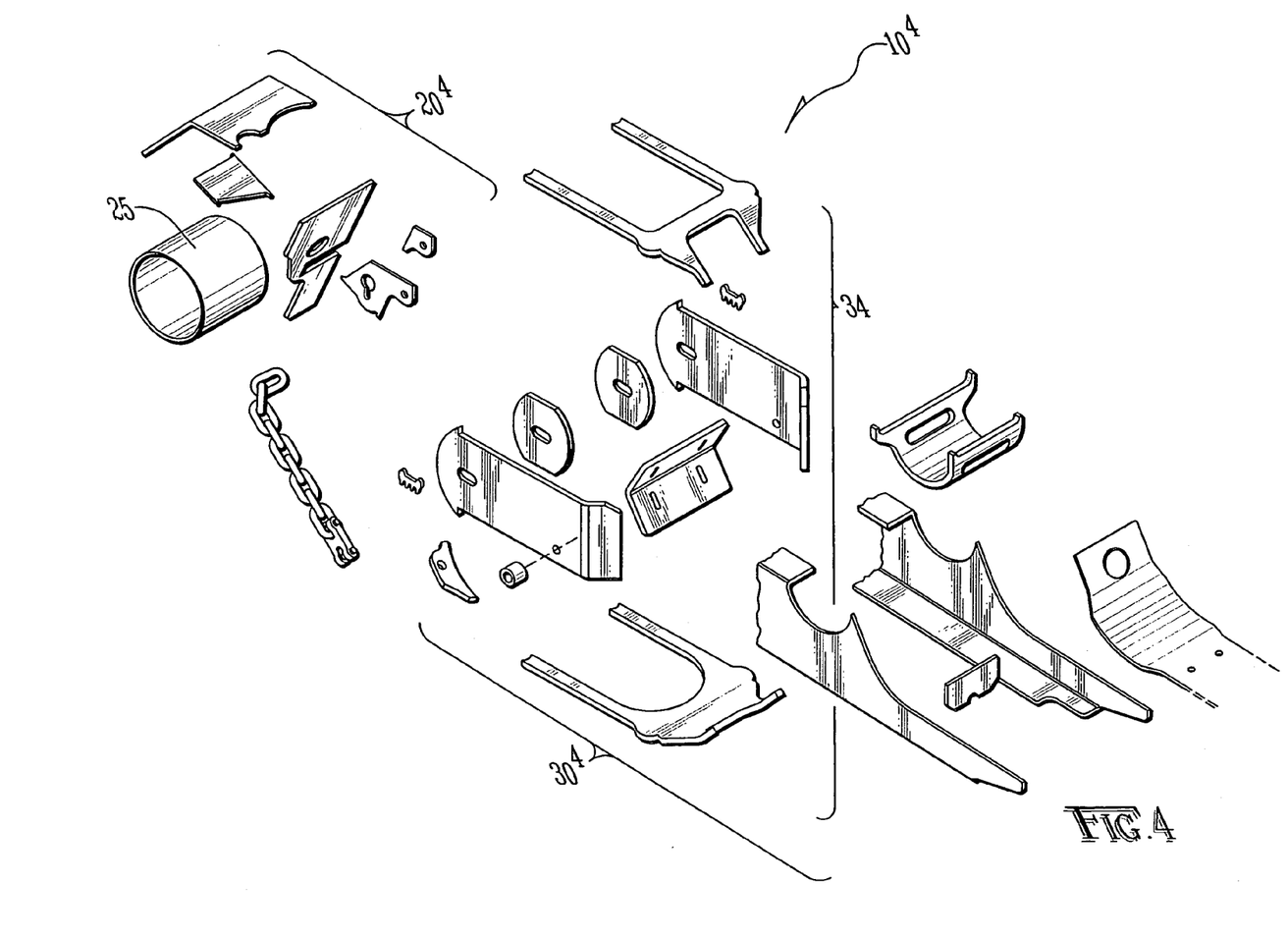
FIG. 4 is an exploded perspective view comparable to FIG. 2a, except showing a still different embodiment of a vehicular suspension system in accordance with the invention wherein, although like FIGS. 1 and 2a this view shows an underslung rocker- or control-beam(s), unlike in FIGS. 1 and 2a this view shows rocker- or control-beam's leading, pivoted end configured as a yoke with spaced arms for flanking the transverse bushing sleeve, which has been moved from the leading, pivoted end of the rocker- or control-beam and instead been incorporated in the rocker hanger.

To turn briefly to FIGS. 3 and 4, they show an alternative versions of the vehicular suspension system $10^3$ and $10^4$ in accordance with the invention.

FIG. 3 can be contrasted to FIGS. 1 and 2a, which show underslung beam-to-axle positioning. That is, FIG. 3 shows overslung beam-to-axle positioning.

The FIG. 4 vehicular suspension system $10^4$ returns back to incorporating underslung beam-to-axle positioning. However, what is different with FIG. 4 is the construction of the leading, pivoted end 34 of the rocker- or control-beam $30^4$. That is, this leading pivoted end 34 is configured in the fashion of a yoke, having spaced arms, as for flanking the transverse bushing sleeve 25. Indeed, the transverse bushing sleeve 25 is moved from being a component of the leading, pivoted end of the beam 30 in FIG. 1 (see, eg., 35) to instead being a component of the rocker hanger $20^4$ in FIG. 4.

Figures 5, 6:
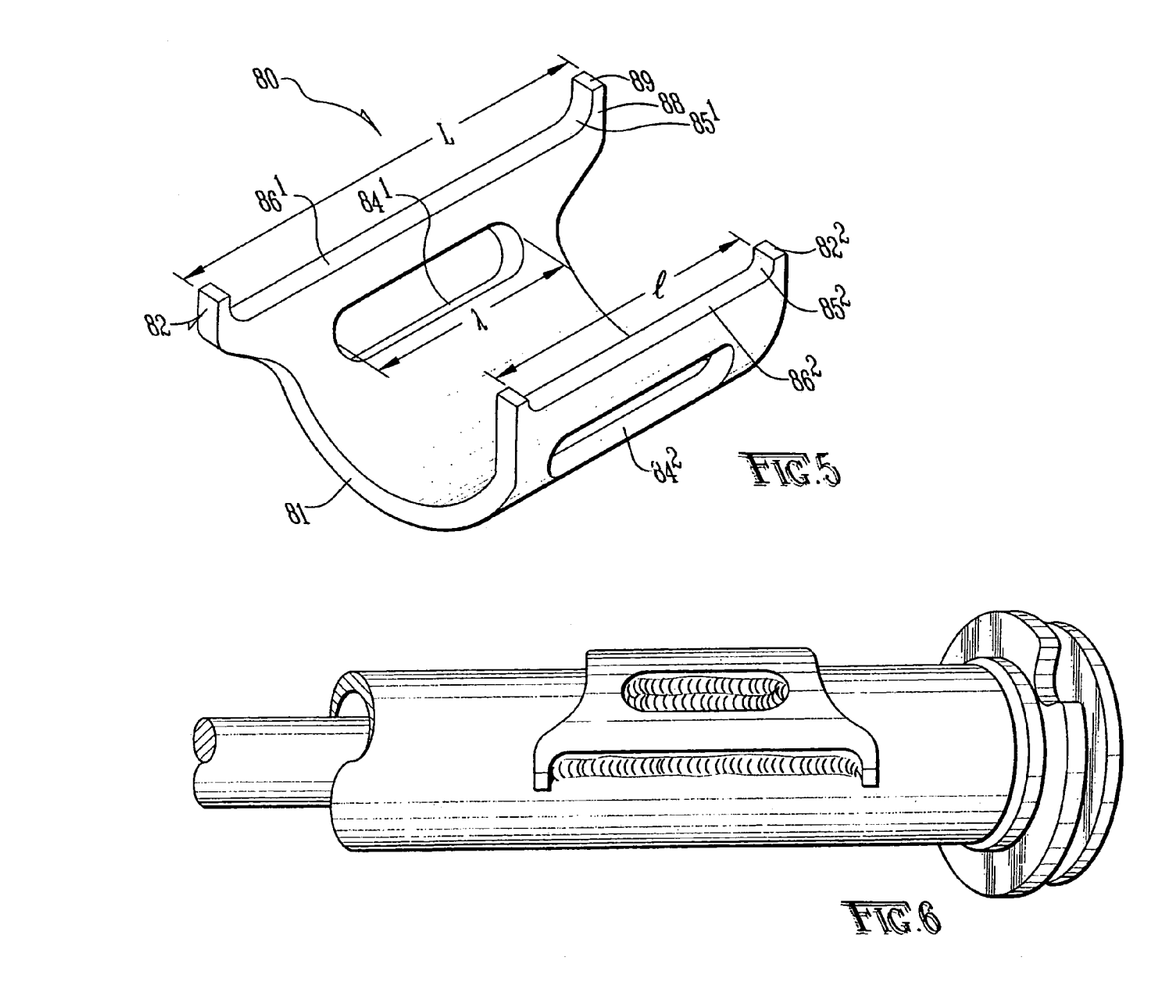
FIG. 5 is an enlarged perspective view of an axle saddle in accordance with the invention and as shown previously in FIGS. 2a, 3 (although inverted therein) and 4.
FIG. 6 is a perspective view showing portions of the axle saddle of FIG. 5 in a welded up assembly condition with an axle (that forms no part of the invention)

FIG. 5 shows a preferred embodiment for the axle saddle 80 in accordance with the invention, as shown in isolation. The axle saddle 80 is formed on substantially a cylindrical geometry, comprising a portion or longitudinal slice of a cylinder. Indeed, the axle saddle 80 hereof nearly defines semi-cylinder.

More particularly, the axle saddle 80 extends longitudinally between opposite, arcing, lateral edges 81. In addition, the axle saddle 80 extends along the warp of the cylindrical plane of its main body between spaced leading and trailing longitudinal edges $82^1$ and $82^2$. Associated with each of the longitudinal edges $82^1$ and $82^2$ are closely allied, elongated slot apertures $84^1$ and $84^2$, respectively. Each elongated slot aperture $84^1$ or $84^2$ is oriented on a lengthwise axis of its own that is substantially parallel with the longitudinal axis of symmetry for the cylindrical geometry of the axle saddle 80, including being substantially parallel to the corresponding longitudinal edge $82^1$ or $82^2$ with which it is most closely allied.

The trailing longitudinal edge $82^2$ is recessed into the main material of the axle saddle 80 by opposite incurved curvatures $85^2$ that straighten out in a longitudinal weld track $86^2$ that comprises a majority of the overall longitudinal extent of the axle saddle 80 as a whole. To turn to the leading longitudinal edge $82^1$, it is formed with multi-part aspects. That is, in one part, the leading longitudinal edge $82^1$ is formed with opposite wings 88. These wings 88 provide a gain for the longitudinal extent of the leading longitudinal edge $82^1$ (indicated as the measure "L" in the drawing) over the nominal longitudinal extent between the lateral edges 81 (indicated as the measure "l" in the drawing). In other part, the leading longitudinal edge $82^1$ is comparably recessed in as the trailing longitudinal edge $82^2$. That is, the leading longitudinal edge $82^1$ is recessed into the main material of the axle saddle 80 by opposite incurved curvatures $85^1$ that straighten out in a longitudinal weld track $86^1$ that comprises a majority of the overall longitudinal extent "L" of the leading longitudinal edge $82^1$ as a whole. What is left at the opposite extremities are a pair of prong tips 89 as shown.

Length aside, it is a non-limiting design objective of the invention that each of the recessed-in longitudinal edge $82^1$ or $82^2$ of the axle saddle 80 closely approximates a half (½) symmetry of the elongated slotted apertures $84^1/84^2$.

FIG. 6 shows various ones of the inventive objective(s) behind this design of inwardly-recessed longitudinal weld tracks (eg., $86^1$ or $86^2$ in FIG. 5) in combination with closely allied elongated slot apertures (eg., $84^1$ or $84^2$ in FIG. 5). More particularly, FIG. 6 shows a leading longitudinal edge and its allied elongated slot aperture welded up to a prior art axle (which forms no part of the invention). Both the leading longitudinal edge and its closely allied, elongated slot aperture are welded to the axle by a multi-pass welding operation, to lay down multiple layers, wherein preferably this comprises at least three passes. Briefly, for background, welds deposited in two or more layers are generally better than those deposited in a single layer because the second and subsequent layers partly anneal the preceding layers, thereby reducing glass-like brittleness, and hence a joint of improve structure will result.

FIG. 6 shows that the elongated slot aperture is nearly smoothly filled with a hardened weld pool. More significantly, the elongated slot aperture affords the welder an endless track to run weld circuits around without having to leave behind any weld-seam ends or terminuses. Consequently, this avoids weld undercutting problems at any ends, which problems are something like an initiation site for a crack to form and thereafter unzip the weld seam. More importantly, the elongated slot aperture affords the welder a longitudinal pass along both sides of itself. To refer back to FIG. 5, the elongated slot apertures $84^1$ and $84^2$ are both about the same size, each having a longitudinal extent indicated in the drawing as the measure "λ." Since any one of the elongated slot apertures $84^1$ or $84^2$ has two such elongated sides, then each side acts as a longitudinal weld track spaced away from each other.

Returning back to FIG. 6, it shows that the leading half of the axle saddle (eg., 80) is secured to the axle (eg., A) by three longitudinal weld tracks, which together are substantially greater than the mere nominal width of the axle saddle (eg., 80). The foregoing statement can be expressed in the previously established math symbols as follows:

$$\text{"L"}+(2\times\text{"}\lambda\text{"})>>\text{"l"} \tag{1}$$

To give example values to the foregoing measures, assume a preferred axle A of the prior art measures five inches O.D. (12.7 cm Ø). Preferably then the inventive axle saddle 80 would have a nominal longitudinal extent "l" measuring about six inches (~15¼ cm). More preferably still would be if the longitudinal span "L" between the prong tips 89 of the wings 88 measures about eight inches (~20⅓ cm). It would be additionally preferred if the longitudinal extent "λ" of the leading, elongated slot aperture $84^1$ measures about four to four-and-one-half inches (~10⅛ to ~11⅜ cm). Therefore, the advantages over a mere extent of "λ" in contrast to the span "L" between the prong tips 89 in combination with the leading elongated slot aperture $84^1$'s two sides extending about "λ" each provides a substantial increase. For example, $$8''+(2\times4\frac{1}{2}'')>>6'' \tag{2}$$

That is, the right-side of equation (2)'s six inches (~15¼ cm) is much less than the left-side's seventeen inches (~43⅛ cm). In sum, the combination of the wings 88 and leading elongated slot aperture $84^1$ affords a designer the opportunity to distribute the incremental stress-carrying capacity of the leading half of the axle saddle 80's saddle-to-axle loads over about seventeen inches (~43⅛ cm) of weld seam in contrast to a simple six inches (~151¼ cm) without.

FIG. 6 shows another of the various advantages of the inventive configuration for the design of the axle saddle. Namely, the recessed-in weld tracks (eg., $86^1$ or $86^2$) on either the leading or trailing longitudinal edges allows the following distinct advantage. That is, the weld seams therein can be terminated in smoothly diminishing ends or terminuses. In other words, at least the terminuses are not bluntly ended bulbs which afford under-cutting or longitudinally in-creeping crack propagation from initiation sites in such bluntly ended bulbs. The objective is to flare out the weld seams in directions (eg., the radial direction) and diminish them in smoothly receding tapers so as to minimize crack initiation and propagation as plagues bluntly-ended weld seams, by a phenomenon referred to in the industry as weld undercutting.

FIG. 2a, representative of the other versions $10^3$ and $10^4$ of the inventive suspension system as well, shows further aspects of the beam-to-saddle connection.

Again, the beam 30 is preferably is a construction of laterally opposed channel members 70 and 71. The weld seams which join the channel members are oriented to extend over the top and bottom of the welded up end-assembly 30 (weld seams are not shown in FIG. 2a). The beam 30 is formed with a cut-out 72 sized and arranged generally for a close-fitting joining-up with the axle saddle 80's outside surface. That is, the cut-out 72 is defined by longitudinal weld tracks 73 and 74 along the top flanges of the web members 70 and 71 respectively. The cut-out is further defined by arc-section lateral weld tacks 76 and 77. Given all the foregoing lines of weld tracks, the rocker- or control-beam 30 is thereby substantially secured or fixed to the axle saddle 80.

Figure 7:
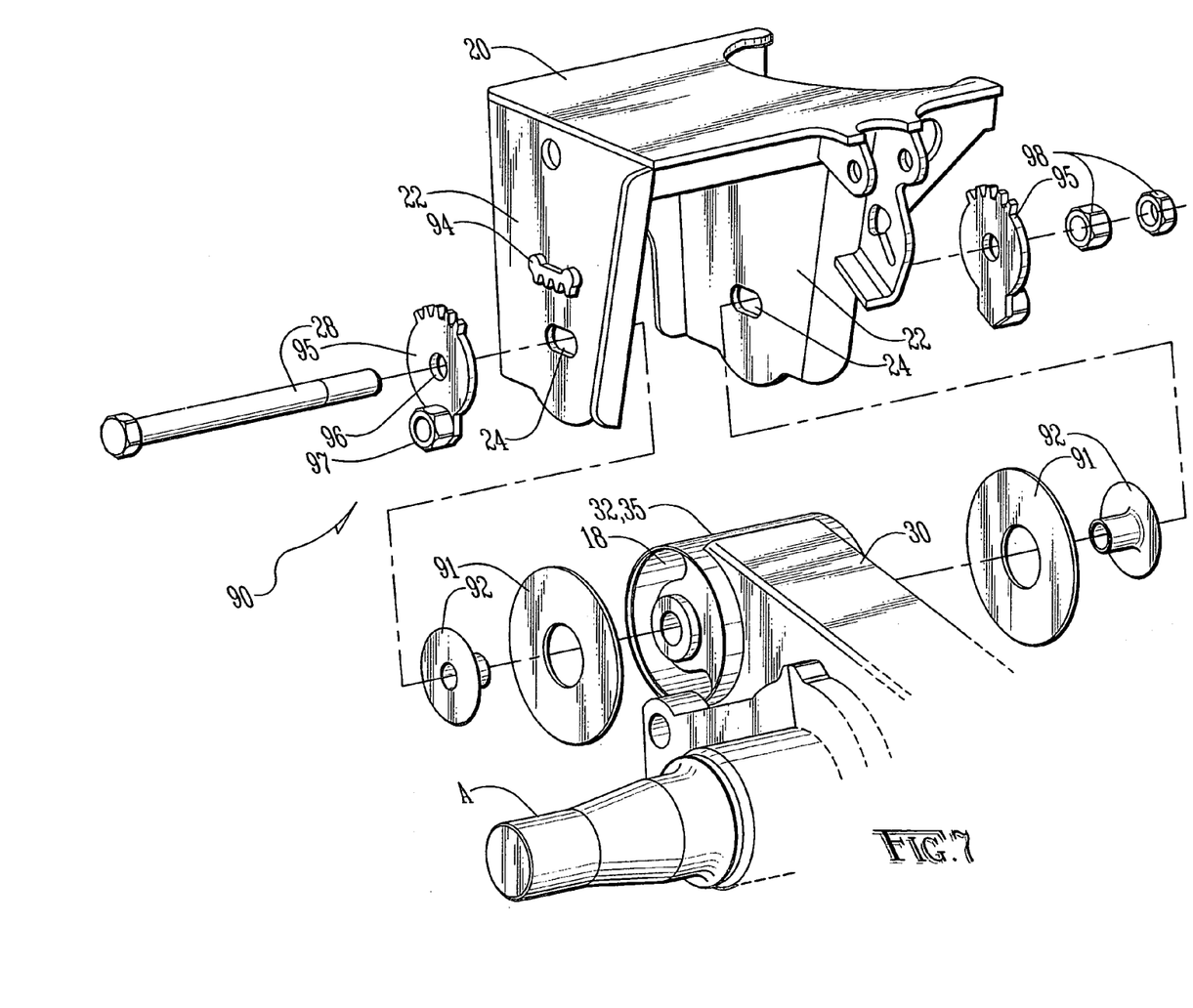
FIG. 7 is an enlarged exploded perspective view of portions of FIG. 1, with various elements illustrated in more particular detail and various other elements removed from the view for convenience sake in order to better show the rocking-axis alignment subsystem in accordance with the invention.

To now refer to FIG. 7, it shows a preferred embodiment of a rocking-axis alignment subsystem 90 in accordance with the invention. As described previously, the rocker- or control-beam 30's leading, pivoted end 32 or 34 is configured for rocking coupling with its associated rocker hanger.

In this FIG. 7, the beam 30's leading, pivoted end 32 comprises a transverse bushing sleeve 35, in which is inserted a bushing 18 for it. The bushing sleeve 35 and bushing 18 are flanked by opposite wear washers 91 as well as opposite collar inserts 92 therefor. The axle A is partly broken away in the drawing, as are other parts. The rocker hanger 20 comprises a pair of spaced flanges 22, each formed with a matching alignment slot 24 for accepting the through insertion of the pivot bolt 28. Importantly, the pivot bolt 28's axis determines the rocking axis for the rocker- or control-beam 30 relative to the rocker hanger 20. The pivot bolt 28's actual position within the alignment slots 24 is adjustable by virtue of the rocking axis alignment subsystem 90, as to be more particularly described next.

To review FIG. 4 very briefly, the rocker- or control-beam's leading, pivoted end is configured as a yoke 34, with spaced arms, which are arranged and spaced for flanking and clasping the transverse bushing sleeve 25 that in this instance is attached to the hanger. Regardless, the rocking-axis alignment subsystem 90 in accordance with the invention is readily adaptable to work with the FIG. 4 version 10⁴ of the invention as well.

In FIG. 7, the rocking-axis alignment subsystem 90 preferably comprises a gear rack 94 fixed to one, the other, or both of the rocker hanger 20's flanges 22. This or these one or two gear racks 94 are preferably spaced radially away from the respective slotted aperture 24 on the same flange 22, wherein "radially" spaced away is understood as referenced in the plane of the rocker hanger 20's flanges 22.

The rocking-axis alignment subsystem 90 further comprises an alignment lever 95 having an aperture 96 for receiving and driving the pivot bolt 28 through the range of available positions between the opposite extremes therefor relative the hanger 20. The alignment lever 95 preferably has an arc section formed with gear teeth. These gear teeth are sized and configured for meshing with the gear rack 94 as shown in part. This alignment lever 95 preferably further includes a crank attachment structure 97 adapted for accepting a releasably coupled drive crank (not shown) as would allow a worker to input a cranking force to the alignment lever 95 in order to move the pivot bolt 28 to any of various alignment positions available to it in the alignment slot 24. FIG. 7 shows an example crank attachment structure 97 to comprise a hexagonal nut welded to a tab on the alignment lever 95.

In use, an installer or worker inserts the pivot bolt 28 through all of the following:—namely, the alignment lever(s) 95, the alignment slots 24 in the rocker hanger 20's flanges 22, the rocking- or control-beam 30's drive hole's therefor, and the bushing 18 (as well as all or any other auxiliary components such as collars 92 and washers 91). After threading the pivot bolt 28 through the applicable aforementioned structure, such a worker or installer can crank the pivot bolt 28 to any alignment between the range of available position between the extremes afforded by the alignment slot(s) 24, and thereafter tighten and fix the position of the pivot bolt relative the rocker hanger 28 by virtue of tightening the nut and jam nut combination 98 therefor.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An axle saddle for welding to a cylindrical vehicle axle and a rocker- or control-beam of a vehicular suspension system, comprising:
    a body forming generally a longitudinal slice of a cylinder, sized to fit closely around a portion of the cylindrical vehicle axle;
    said body extending longitudinally between spaced, arcing lateral edges as well as extending in a cylindrical plane between spaced longitudinal edges, said longitudinal edges adapted for forming welded seams to or with the vehicle axle;
    said body being formed with at least one longitudinally elongated, slot aperture that is proximately associated and aligned in a generally parallel relation with at least one longitudinal edge, said slot aperture providing an endless weld track and relieving in part the stress load carried through the welded seam of the associated longitudinal edge;
    at least one of the longitudinal edges of said body being formed with a recessed-in weld track, having a major longitudinal track portion being flanked between opposite incurved curved portions, wherein said incurved curved portions reduce weld undercutting problems.

2. The axle saddle of claim 1 wherein said at least one of the longitudinal edges of said body further comprising spaced wing extensions to further elongate the measure of said longitudinal edge.

3. An axle saddle for welding to a cylindrical vehicle axle and a rocker- or control-beam of a vehicular suspension system, comprising:
    a body forming generally a longitudinal slice of a cylinder, sized to fit closely around a portion of the cylindrical vehicle axle;
    said body extending longitudinally between spaced, arcing lateral edges as well as extending in a cylindrical plane between spaced longitudinal edges, said longitudinal edges adapted for forming welded seams to or with the vehicle axle;
    said body having, along at least one of the longitudinal edges, spaced wing extensions to further elongate the measure of said longitudinal edge; said body at that at least one longitudinal edge being formed with a recessed-in weld track, having a major longitudinal track portion being flanked between opposite incurved curved portions, wherein said incurved curved portions reduce weld undercutting problems.

4. The axle saddle of claim 3 further comprising the body being formed with at least one longitudinally elongated, slot aperture that is proximately associated and aligned in a generally parallel relation with at least one longitudinal edge, said slot aperture providing an endless weld track and relieving in part the stress load carried through the welded seam of the associated longitudinal edge.

5. An axle saddle for welding to an elongated vehicle axle having an angularly-endless outer surface extending between spaced axle-ends, said axle saddle furthermore being adapted for connecting up to a vehicular suspension system such as a rocker- or control-beam thereof; said axle saddle comprising:
    a body having a concave inner surface as well as a spaced convex outer surface and not only extending longitudinally between spaced, arcing lateral edges but also extending angularly between spaced longitudinal edges, said longitudinal edges adapted for forming welded seams to or with the vehicle axle;
    said body being formed with at least one longitudinally-elongated slot aperture that is proximately associated and aligned in a generally parallel relation with at least one longitudinal edge, said slot aperture providing an endless weld track and relieving in part the stress load carried through the welded seam of the associated longitudinal edge;
    at least one of the longitudinal edges of said body being formed with a recessed-in weld track, having a major longitudinal track portion being flanked between opposite incurved curved portions, wherein said incurved curved portions reduce weld undercutting problems.

6. The axle saddle of claim 5 wherein said at least one of the longitudinal edges of said body further comprising spaced wing extensions to further elongate the measure of said longitudinal edge.

7. The axle saddle of claim 5 wherein said body's concave inner surface is formed for general close-surrounding conformance over angularly-extending portions of the vehicle-axle's angularly-endless outer surface.

8. The axle saddle of claim 7 wherein said body's concave inner surface traces a cylindrical patch whereby said concave inner surface is adapted for close-surrounding conformance over cylindrical vehicle axles.

* * * * *